United States Patent
Bruno et al.

(10) Patent No.: US 9,694,279 B2
(45) Date of Patent: *Jul. 4, 2017

(54) GAME AVAILABILITY IN A REMOTE GAMING ENVIRONMENT

(71) Applicant: MICROSOFT TECHNOLOGY LICENSING, LLC, Redmond, WA (US)

(72) Inventors: John Peter Bruno, Snoqualmie, WA (US); Donald James McNamara, Woodinville, WA (US); Hsiang-Ling Jamie Lin, Redmond, WA (US); Christopher Lane Boedigheimer, Redmond, WA (US); Per-Ola Anders Orvendal, Carnation, WA (US); Joseph Cusimano, Carnation, WA (US); Scott Q. Longstreet, Maple Valley, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/054,798

(22) Filed: Feb. 26, 2016

(65) Prior Publication Data

US 2016/0175708 A1 Jun. 23, 2016

Related U.S. Application Data

(63) Continuation of application No. 13/898,383, filed on May 20, 2013, now Pat. No. 9,295,915.

(51) Int. Cl.
*G06F 15/16* (2006.01)
*A63F 13/352* (2014.01)
(Continued)

(52) U.S. Cl.
CPC ............ *A63F 13/352* (2014.09); *A63F 13/12* (2013.01); *A63F 13/30* (2014.09); *A63F 13/35* (2014.09);
(Continued)

(58) Field of Classification Search
CPC .......... A63F 2300/531; A63F 2300/534; A63F 2300/535; A63F 13/12; A63F 13/30;
(Continued)

(56) References Cited

U.S. PATENT DOCUMENTS 7,917,625 B1 3/2011 Cook
2007/0106798 A1 5/2007 Masumitsu et al.
(Continued)

FOREIGN PATENT DOCUMENTS

FR 2922120 A1 4/2009

OTHER PUBLICATIONS

Yuan, et al., "Application of Thread Pool Technology in the Network Game Server", Published on: Jun. 22, 2006, Available at: http://wenku.baidu.com/view/61d339fe910ef12d2a9e757.hmtl?re=view.
(Continued)

*Primary Examiner* — Lawrence Galka
(74) *Attorney, Agent, or Firm* — Shook, Hardy & Bacon L.L.P.

(57) ABSTRACT

Embodiments of the present invention monitor and dynamically manage game instances within a game service. A game service provides a remote gaming environment to which users connect over a wide area network, such as the Internet. For example, embodiments of the invention may forecast demand for a specific game title. The demand forecast is used to determine how many standby game instances are needed to meet demand as players join and leave game sessions. Games with higher demand may have more
(Continued)

standby game instances ready for players to drop in. Games with less demand may have fewer active game instances running waiting for players to drop in.

20 Claims, 8 Drawing Sheets

(51) Int. Cl.
A63F 13/30 (2014.01)
G06F 9/50 (2006.01)
A63F 13/35 (2014.01)
A63F 13/358 (2014.01)

(52) U.S. Cl.
CPC ............ *A63F 13/358* (2014.09); *G06F 9/505* (2013.01); *G06F 9/5027* (2013.01); *G06F 9/5061* (2013.01); *A63F 2300/535* (2013.01); *A63F 2300/5533* (2013.01); *A63F 2300/5593* (2013.01)

(58) Field of Classification Search
CPC ...... A63F 13/35; A63F 13/352; A63F 13/358; G06F 9/5027; G06F 9/505; G06F 9/5061; G06F 11/3433; G06Q 10/06315
USPC ...................................... 709/226; 463/29, 42
See application file for complete search history.

(56) References Cited

U.S. PATENT DOCUMENTS

| | | |
|---|---|---|
| 2008/0207315 A1 | 8/2008 | Bloebaum et al. |
| 2009/0199198 A1 | 8/2009 | Horii et al. |
| 2009/0222562 A1 | 9/2009 | Liu et al. |
| 2010/0093438 A1 | 4/2010 | Baszucki et al. |
| 2010/0250746 A1 | 9/2010 | Murase |
| 2012/0102185 A1 | 4/2012 | Fernandes |
| 2012/0246301 A1 | 9/2012 | Vyrros et al. |
| 2012/0254444 A1 | 10/2012 | Harchol-Baler et al. |
| 2013/0035164 A1 | 2/2013 | Osvald et al. |
| 2013/0054804 A1 | 2/2013 | Jana et al. |
| 2013/0159532 A1 | 6/2013 | Boero et al. |
| 2014/0309039 A1 | 10/2014 | Yoshida et al. |

OTHER PUBLICATIONS

"Thread Pool Pattren—Wikipedia, the Free Encyclopedia", Published on: Mar. 11, 2013 Available at: http://en.wikipedia.org/w/index.phpti%20tle=Thread_pool_pattern&0ldid=543487639.

Reitbauer, et al., "Theory Behind Performance-Java Enterprise Performance Book (Dynatrace)", published Mar. 7, 2012, http://javabook.compuware.com/content/intro/theory-behindperformance.aspx.

Singh, Simar, "Performance Concurrency Troubleshooting Final", published Mar. 5, 2012, http://www.slideshare.net/SimarSingh1/performance-concurrency-troubleshooting-final-11863880.

Wang, et al., "The Impact of Soft Resource Allocation on N-Tier Application Scalability", In IEEE International Parallell & Distributed Processing Symposium, May 167, 2011, pp. 1034-1045.

Kenesi, et al., "Opimizing Multiplayer Gaming Protocols for Heterogeneous Network Environment", In IEEE International Conference on Communications, Jun. 24, 2007, 6 pages.

Ramakrishna, et al., "An Active Self-Optimizing Multiplayer Gaming Architecture", In Proceedings of the Autonomic Computing Workshop, Jun. 2003, 15 pages.

Manweiler, et al., "Switchboard: A Matchmaking System for Multiplayer Mobile Games", In Ninth International Conference on Mobile Systems, Applications and Services, Jun. 28, 2011, 14 pages.

Hunt, Douglas, "Gaming Moves to the Cloud", Published on: Apr. 7, 2011, Available at : http://www/2.alcatel-lucent.com/techzine/gaming-moves-to-the-cloud/, 3 pages.

Shen, et al., "RTSenv: An Experimental Environment for Real-Time Strategy Games", In the Proceedings of 10th Annual Workshop on Network and Systems Support for Games, Oct. 6, 2011, 7 pages.

GAME AVAILABILITY IN A REMOTE GAMING ENVIRONMENT

CROSS-REFERENCE TO RELATED APPLICATIONS

This application is a continuation of U.S. Pat. No. 9,295,915 filed May 20, 2013, and titled "GAME AVAILABILITY IN A REMOTE GAMING ENVIRONMENT," the entirety of which is hereby incorporated by reference.

BACKGROUND

Video games have become increasingly popular. Some video games allow multiple players to interact within the same game using client devices that are remotely located from each other. For example, in a peer-to-peer gaming environment, multiple clients throughout the world could connect over a network to a game hosted by one of the client devices. In another example, a server may host a game that multiple client devices join over a wide area network.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention monitor, forecast demand, and dynamically manage game instances within a remote game service. The game service provides a remote gaming environment to which users connect over a wide area network, such as the Internet. For example, the game service could utilize a series of servers, or a series of server farms located throughout the world to host video games. Players then connect to the gaming service using a variety of different client devices including game consoles, smartphones, tablets, personal computers, and other computing devices.

Embodiments of the present invention monitor characteristics of game play to determine whether game instances should be added or subtracted from the game service. Embodiments of the invention may monitor game instances by game title. For example, embodiments of the invention may forecast that demand for a specific game title within a data center is 400 game instances. The demand forecast is used to determine how many standby game instances are needed to meet demand as players join and leave game sessions. Games with higher demand may have more standby game instances ready for players to drop in. Games with less demand may have fewer active game instances running waiting for players to drop in. The number of standby instances of various games may be different based on the location of a particular server and the players serviced by the server.

BRIEF DESCRIPTION OF THE DRAWINGS

Embodiments of the invention are described in detail below with reference to the attached drawing figures, wherein.

DETAILED DESCRIPTION

Figure 1:
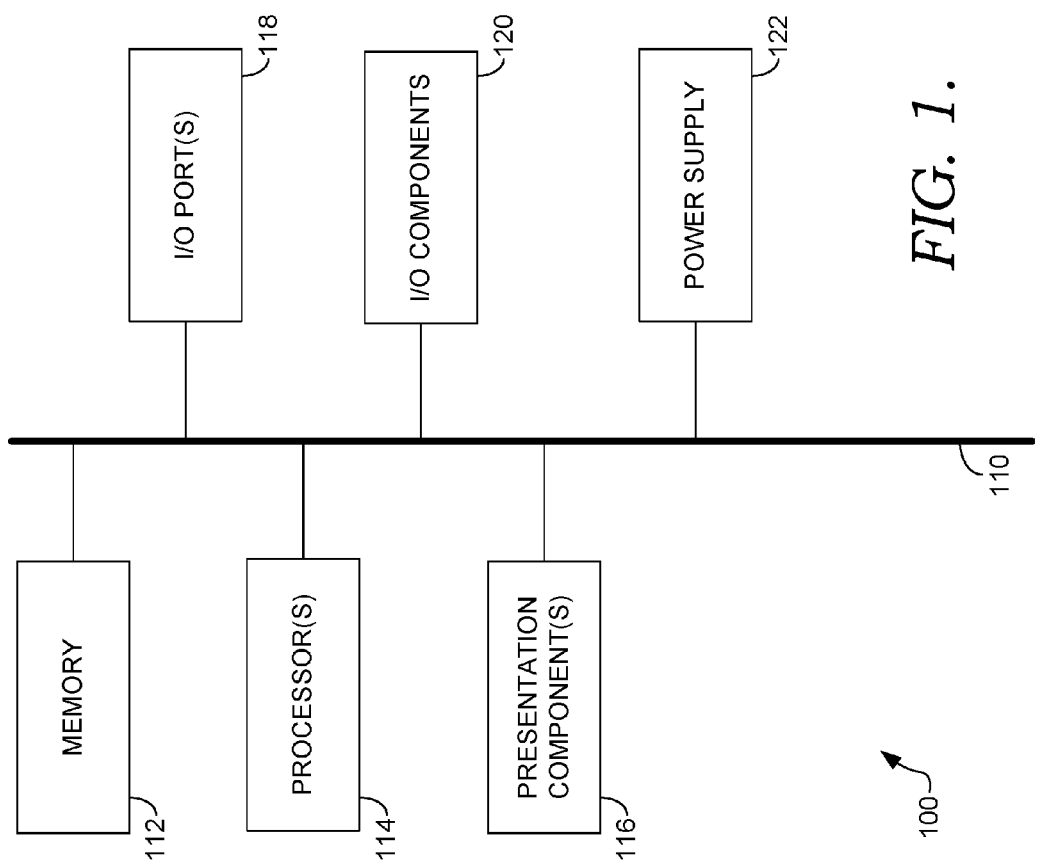
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention monitor, forecast demand, and dynamically manage game instances within a remote game service. The game service provides a remote gaming environment to which users connect over a wide area network, such as the Internet. For example, the game service could utilize a series of servers, or a series of server farms located throughout the world to host video games. Players then connect to the gaming service using a variety of different client devices including game consoles, smartphones, tablets, personal computers, and other computing devices.

Embodiments of the present invention monitor characteristics of game play to determine whether game instances should be added or subtracted from the game service. Embodiments of the invention may monitor game instances by game title. For example, embodiments of the invention may forecast that demand for a specific game title within a data center is 400 game instances. The demand forecast is used to determine how many standby game instances are needed to meet demand as players join and leave game sessions. Games with higher demand may have more standby game instances ready for players to drop in. Games with less demand may have fewer active game instances running waiting for players to drop in. The number of standby instances of various games may be different based on the location of a particular server and the players serviced by the server.

In a standby state, the game objects in active memory are accessible and manipulable by a processing device that executes the game. Active memory contrasts with secondary memory in which game objects may be stored passively while they are not manipulable in a game action. The standby game instances running in active memory are not attached to a player profile or an I/O channel from a game client. Once the player requests a game, the player's player profile is loaded into the running game instance and an I/O channel is mapped from the game client to the game instance. Thus, the standby game instance may be running without a player profile or an I/O channel. Once the player or players are added to the standby instance, the game instance becomes an active instance.

A game service may host multiple instances of the same game title along with instances of other game titles. Each instance of the game title runs in a game session. The game session runs the video game code responsible for creating the playing experience for the users. Different parts of the game service may be allocated to run game sessions for a specific game title. The monitoring and allocation of resources may be done on an overall basis at the game service level, to part of the game service on a title-by-title basis level, or a combination.

The game session runs a video game title accessed by one or more players. Embodiments of the present invention run game titles that are written for the game service. Titles written for the game service do not use code to manage server resources or other remote computing resources. Instead, the computing resources allocated to the game service are dynamically updated in response to changes in game service compute characteristics.

Various characteristics of the game service may be monitored and used to forecast demand and determine an optimum number of game instances to have in standby. For example, the number of active game sessions running for a title are monitored, along with requests for new games sessions, and the time it takes to generate a new game session for the game title. These characteristics may be used to calculate the optimum number of standby game sessions needed to meet demand as the number of game sessions increases or decreases.

When a game session ends, the computing resources may be recycled to a standby game session running the same title. Recycling to the same title allows the machine to run the game without the game code needing to be reloaded onto the machine. When only a chunk of a game title, such as a level, is loaded into a machine's active memory, then the computing device may be recycled to a game session running the same level.

Further, the health of the game session or computing resources associated with the game session may be monitored. In one embodiment, computing resources showing unhealthy characteristics, such as slower than expected processing times, are not recycled and instead healthy resources are used to create standby game sessions.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Exemplary Online Gaming Environment

Figure 2:
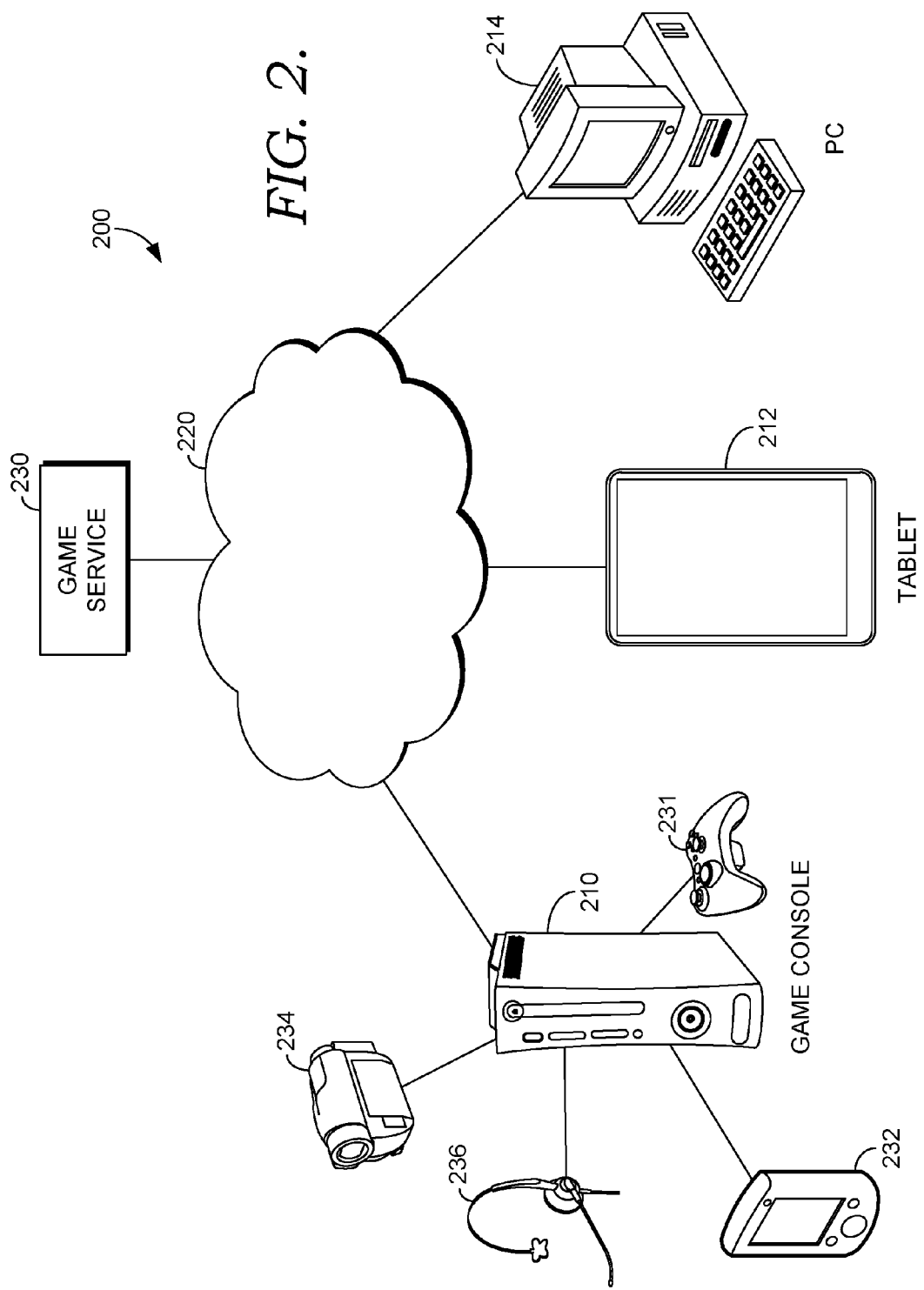
FIG. 2 is a diagram of an online gaming environment, in accordance with an embodiment of the present invention.

Turning now to FIG. 2, an online gaming environment 200 is shown, in accordance with an embodiment of the present invention. The online gaming environment 200 comprises various game clients connected through a network 220 to a game service 230. Exemplary game clients include a game console 210, a tablet 212, and a personal computer 214. Use of other game clients, such as smart phones, are also possible. The game console 210 may have one or more game controllers communicatively coupled to it. In one embodiment, the tablet 212 may act as an input device for a game console 210 or a personal computer 214. In another embodiment, the tablet 212 is a stand-alone game client. Network 220 may be a wide area network, such as the Internet.

The controllers associated with game console 210 include game pad 231, tablet 232, headset 236, and depth camera 234. A game console may be associated with control devices that generate both a rich input and a basic input. Individual controllers are capable of generating different kinds of inputs and a single controller could generate both a rich input and an basic input.

The game pad 231 may be capable of generating basic control signals, such as those generated by button selections and joystick movement. Movement data such as that generated by accelerometers and gyros within the game pad 231 may be examples of rich sensory data. In some implementations, the movement data is not considered a rich sensory data.

The tablet 232 can be both a game controller and a game client as mentioned previously with tablet 212. Tablet 232 is shown coupled directly to the game console 210, but the connection could be indirect through the Internet or a subnet. In one embodiment, the game service 230 helps make a connection between the tablet 232 and the game console. The tablet 232 is capable of generating numerous input streams and may also serve as a display output mechanism. In addition to being a primary display, the tablet 232 could provide supplemental game information near information shown on a primary display coupled to the game console 210, or simply be a control surface. The input streams generated by the tablet 232 include video and picture data, audio data, movement data, touch screen data, and keyboard input data.

The headset 236, captures audio input from a player and the player's surroundings and may also act as an output device if it is coupled with a headphone or other speaker.

The depth camera 234 generates a depth cloud used as a control input. The depth camera 234 may an use infrared camera to determine a depth, or distance from the camera for each pixel captured. Stereoscopic depth cameras are also possible. In addition, the depth camera 234 may capture a typical color stream or picture. The depth camera 234 may have several image gathering components. For example, the depth camera 234 may have multiple cameras.

Game service 230 may comprise multiple computing devices communicatively coupled to each other. In one embodiment, the game service 230 is implemented using one or more server farms. The server farms may be spread out across various geographic regions including cities throughout the world. In this scenario, the game clients may connect to the closest server farms. Embodiments of the present invention are not limited to this setup.

The game service 230 allows the game to be executed within the computing devices provided by the game service 230. A communication session between the game service and game clients carries input traffic to the game service 230 and returns a rendered game image and/or other game output.

Exemplary Game Client and Game Service for Remote Gaming

Figure 3:
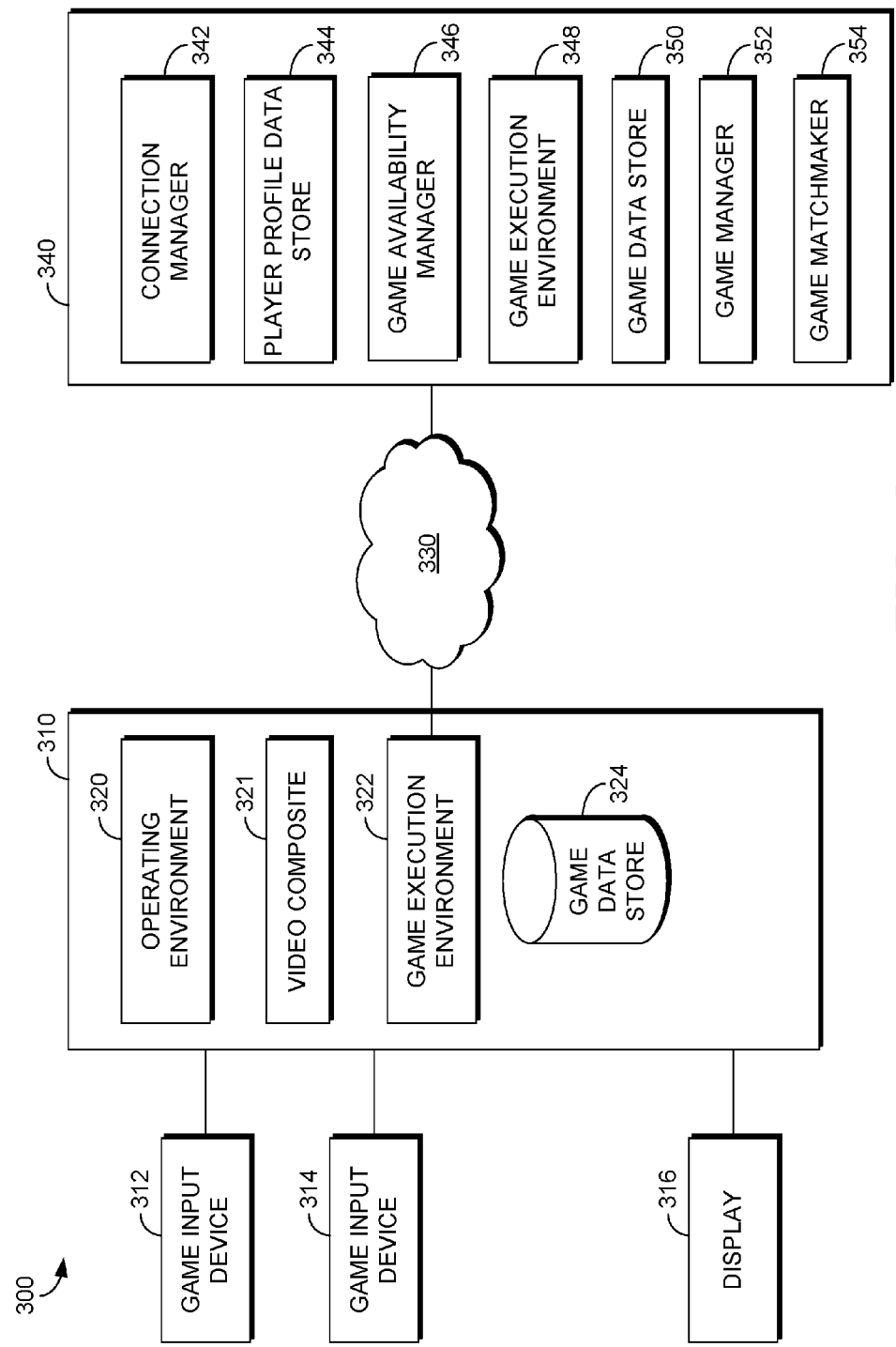
FIG. 3 is a diagram of a remote gaming computing environment, in accordance with an embodiment of the present invention.

Turning now to FIG. 3, an exemplary remote gaming environment 300 is shown, in accordance with an embodiment of the present invention. The remote gaming environment 300 includes a game client 310 communicatively coupled to a game server 340 through a network 330. In one embodiment, the network may be the Internet. The game client 310 is connected to a first game input device 312, a second game input device 314, and a display 316. Exemplary game input devices include game pads, keyboards, a mouse, a touch pad, a touch screen, a microphone for receiving voice commands, a depth camera, a video camera, and a trackball. Embodiments of the present invention are not limited to these input devices. The display 316 is capable of displaying video game content. For example, the display 316 may be a television or computer screen. In another embodiment, the display 316 is a touch screen integrated with the game client 310.

The game client 310 is a computing device that is able to execute video games. The game client 310 could be a tablet or a laptop computer. In another embodiment, the game client 310 is a game console and the display 316 is a remote display communicatively coupled to the game console. The game client 310 includes an operating environment 320, a video composite component 321, a game execution environment 322, and a game data store 324. Other components of the game client 310 are not shown for the sake of simplicity.

The client devices connected to the game session may play different roles for different games. In one embodiment, the client devices only send control signals to the game session. The game code running in the game session processes the control signals to change the game state. For example, a player or object within a game may move in response to the control input. The game instance may generate a rendered video game image that reflects the updated game state and communicate the rendered image to one or more clients connected to the game instance running in the game session. Each client may receive different rendered video game images from the perspective of the player associated with the client. Though described as a client from the perspective of the game service, the client could be a server to other computing devices. For example, a computing device within a residence could serve game content to other computing devices, including tablets or smartphones over a local area network.

In another embodiment, game geometry and other game information is sent from the server and combined with image data resident on the client to generate a rendered video game image on the client device. Other divisions of processing between the client and game service are possible.

The operating environment 320 may be provided by an operating system that manages the hardware and provides services to applications running on the game client 310. The operating environment may allocate client resources to different applications as part of game and communication functions.

The game data store 324 stores downloaded games, game samples, and/or partially downloaded games. Games may be downloaded in playable blocks. To play a game, the game may need to be loaded from the game data store 324 into active memory associated with the game execution environment 322. The game data store 324 may also store player progress files.

The game execution environment 322 comprises the gaming resources on the client 310 required to execute instances of a game or part of a game. In some embodiments, the client 310 does not include a game execution embodiment or the computing resources to execute the game. The game execution environment 322 comprises active memory along with computing and video processing resources. The game execution environment 322 receives gaming controls and causes the game to be manipulated and progressed according to game programming. In one embodiment, the game execution environment 322 outputs a rendered video stream that is communicated to the display 316. The game execution environment 322 may execute part of a game to generate game images that are combined with rendered images received from the game server 340 by the video composite component 321.

The video composite component 321 merges rendered video game images received from the game server 340 with rendered video game images rendered by the client 310 to form a single image that is output to display 316. Rendered video game images could refer to just a single color image or the color image and depth buffer data that is used to successfully composite server and client images. The video composite component may perform scaling and other functions to generate a video output that is appropriate. Some embodiments of the present invention do not use or comprise a video composite component 321.

The game server 340 comprises a connection manager 342, a player profile data store 344, a game availability manager 346, a game execution environment 348, a game data store 350, a game manager 352, and a game matchmaker 354. Though depicted as a single box, the game server 340 could be a server farm that comprises numerous machines, or even several server farms. Several of the servers could act as clients for a central server that coordinates the game experience.

The connection manager 342 builds a connection between the client 310 and the server 340. The connection manager 342 may also provide various authentication mechanisms to make sure that the user is authorized to access the game service provided by the server 340. The connection manager may provide security, encryption, and authentication information to servers and virtual machines as they are added to a game session. The connection manager 342 may also analyze the bandwidth available within a connection and provide this information to components as needed. For example, the resolution of the video game image may be reduced to accommodate limited bandwidth.

The player profile data store 344 may work in conjunction with the connection manager 342 to build and store player information. Part of the player profile may comprise demographic and financial information such as a player's name, address and credit card information or other mechanism for paying for or purchasing games and experiences provided by the game service.

In addition, the player profile data store 344 may store a player's progress within an individual game. A player's score, achievements, and progress through game levels may be stored. Further, the player profile data store 344 may store information about individual player preferences such as language preferences. The player may access the game level information from multiple clients. For example, the player's progress could be accessed from a friend's game console or on the player's mobile device.

Information regarding a player's game client and speed of the network connection may also be stored in the player profile data store 344 and utilized to optimize the gaming experience. For example, in one embodiment, when a geographically proximate server farm is busy, players with higher latency Internet connections may be preferentially connected to proximate server farms while players with lower latency connections may be connected to server farms that are further away. In this way, the players with the network connections that are best able to handle the additional latency are connected to server farms that create additional latency because of their location.

The player profile data store 344 may also store a usage history for the individual player. A player's history of purchasing games, sampling games, or playing games through a game service that does not require the purchase of the games may be stored.

The game availability manager 346 analyzes the usage data to determine, among other things, how many standby instances of a particular game title should be available. In general, games with a high demand will have more standby instances of a game available. Loading a game into active memory to create a standby instance may take a minute or two; thus, games with high churn in and out may also require more standby instances of games to be available. The time it takes to create a standby instance of a particular game title also should be considered. Games that load comparatively quickly may require less standby instances because additional game instances can be generated more quickly as demand changes. In other words, games with a slower load time may require more available standby games.

The game availability manager 346 may also provide information used by game manager 352 or other components to allocate server resources to a particular game pool. Server resources allocated to a particular game pool include the resources needed to execute the active game instances as well as the standby game instances that have no player connected. As demand for various game changes over time, the allocation of resources to game pools can be adjusted. Further, historical usage data may be utilized to anticipate changes. For example, if a first game is played more heavily between 10:00 p.m. and midnight than a second game that is played more heavily during the day, then resources may be switched between the second and first game for the 10:00 p.m.-to-midnight period.

The game availability manager 346 may provide different allocations of standby games to different data centers based on the demographics of players likely to be served by the data center. For example, if a particular game is popular in the Northwest of the United States, then more standby instances of that game title may be available within data centers located in the Northwest. On the other hand, games that are more popular in the Southeast may have comparatively more standby game instances within data centers located in the Southeast.

The game availability manager 346 may provide the game demand information to the game manager 352 as well as other components. In one embodiment, when the resources allocated to a particular game are maxed out so that a player is not able, on a temporary basis, to play the game, the game matchmaker 354 is notified and that game is temporarily removed from the game list. This prevents a player from selecting a game and having a delay before playing. The availability analysis may be very granular based on the data center, time of day, and other events.

The game execution environment 348 comprises the gaming resources required to execute instances of a game. These are the resources described previously that are managed by the game manager 352 and other components. The game execution environment 348 comprises active memory along with computing and video processing. The game execution environment 348 receives gaming controls, such as reduced controller input, through an I/O channel and causes the game to be manipulated and progressed according to its programming. In one embodiment, the game execution environment 348 outputs a rendered video stream that is communicated to the game client. In other embodiments, the game execution environment 348 outputs game geometry, or other representations, which may be combined with local objects on the gaming client to render the gaming video.

The game data store 350 stores available games. The games may be retrieved from the data store and loaded into active memory for use in a game session. The game data store 350 may be described as passive or secondary memory. In general, games may not be played off of the game data store 350. However, in some embodiments, the secondary memory may be utilized as virtual memory, in which case portions of the game data store 350 may also serve as active memory. This illustrates that active memory is not necessarily defined by a particular hardware component, but is defined by the ability of the game resources to actively manipulate and access objects within the memory to execute the game.

The game manager 352 manages players' connections to active games. In one embodiment, there are individual game managers for each game available through the game service. Taking a single game as an example, the game manager will drop players into requested games. In one embodiment, a player may connect to a game through the game manager 352. In other words, the game manager 352 may act as a gatekeeper for communications and connections between individual game instances. When a player drops out of a game, an instruction may go to the game manager 352 to retrieve and save the player's progress into the player's profile within player profile data store 344.

The game matchmaker 354 tracks ongoing game sessions and helps player find a game session to join. The game matchmaker 354 may generate an interface that allows prospective players to search for game sessions in which a friend is participating. The matchmaker 354 may allow players to search for active game sessions having players with similar skill levels, for example, as indicated by player rank, game progress, or achievements obtained within a game. In one embodiment, the matchmaker 354 only returns game sessions having space available for more players.

In another embodiment, the matchmaker 354 may return a list of currently closed game sessions with an estimated wait the player can expect before an opening is available. The wait may be calculated by analyzing churn for the session. The churn measures the rate at which players leave the game session. The churn may be calculated using an average for all game sessions of the same game title. The churn may be specific to the particular game session. Wait time may also take into consideration other players waiting to join. Thus, if four players were waiting to join a session that averages an opening every 30 seconds, then the estimated wait time would be two minutes. The matchmaker 354 may manage a queue of players waiting to join a game and add them to the game as openings become available.

The matchmaker 354 may also generate a list of open game sessions for a player to join. The list may be filtered, even without the prospective player's input, to only list sessions with similar level players or that are otherwise appropriate for the prospective player. For example, only game titles the player has a license to play may be listed. In another embodiment, all games are listed, but an indication lets the player know which games will require purchase of an additional license. The players are given the opportunity to buy a license to play a game through the interface.

The matchmaker 354 may make an effort to keep game sessions full, while killing others, by manipulating the game sessions listed for new players to join. Players are directed to game sessions in a way that minimizes the overall use of computing resources. For example, an effort may be made to keep game sessions full of players instead of having twice as many half-full game sessions. Thus, if a game session is near a threshold number of players where computing resources could be removed, then that game session may not be listed, unless responsive to a specific query for another player or other sought out characteristics unique to that session. This allows the game session to fall below the threshold and for resources to be removed. On the other hand, game sessions with only a few openings may be listed first in an effort to keep the game session full.

Thus, the matchmaker 354 provides search tools to help players find an open game session that meets their needs. When multiple games sessions meet the player's needs, the player may be added to game sessions in a way that minimizes the total number of game sessions running at a given time.

The matchmaker 354 may also select game sessions for player to conserve network resources and provide a better game experience. The matchmaker 354 may look at characteristics of the players' local capabilities for selecting appropriate game session computing resources. As an example, the type of console or the version of the game the player is using may influence which computing resources are selected to run a game session. Further, the player's geographic location influences which data center the player is connected to, in order to minimize network latency. The matchmaker 354 will prioritize connection to game sessions running in the preferred data center. In general, geographically closer data centers will have less latency, but network conditions may vary. In one embodiment, the network conditions are monitored and a player is matched with a game session running in a data center that has the least latency for the specific player.

Figure 4:
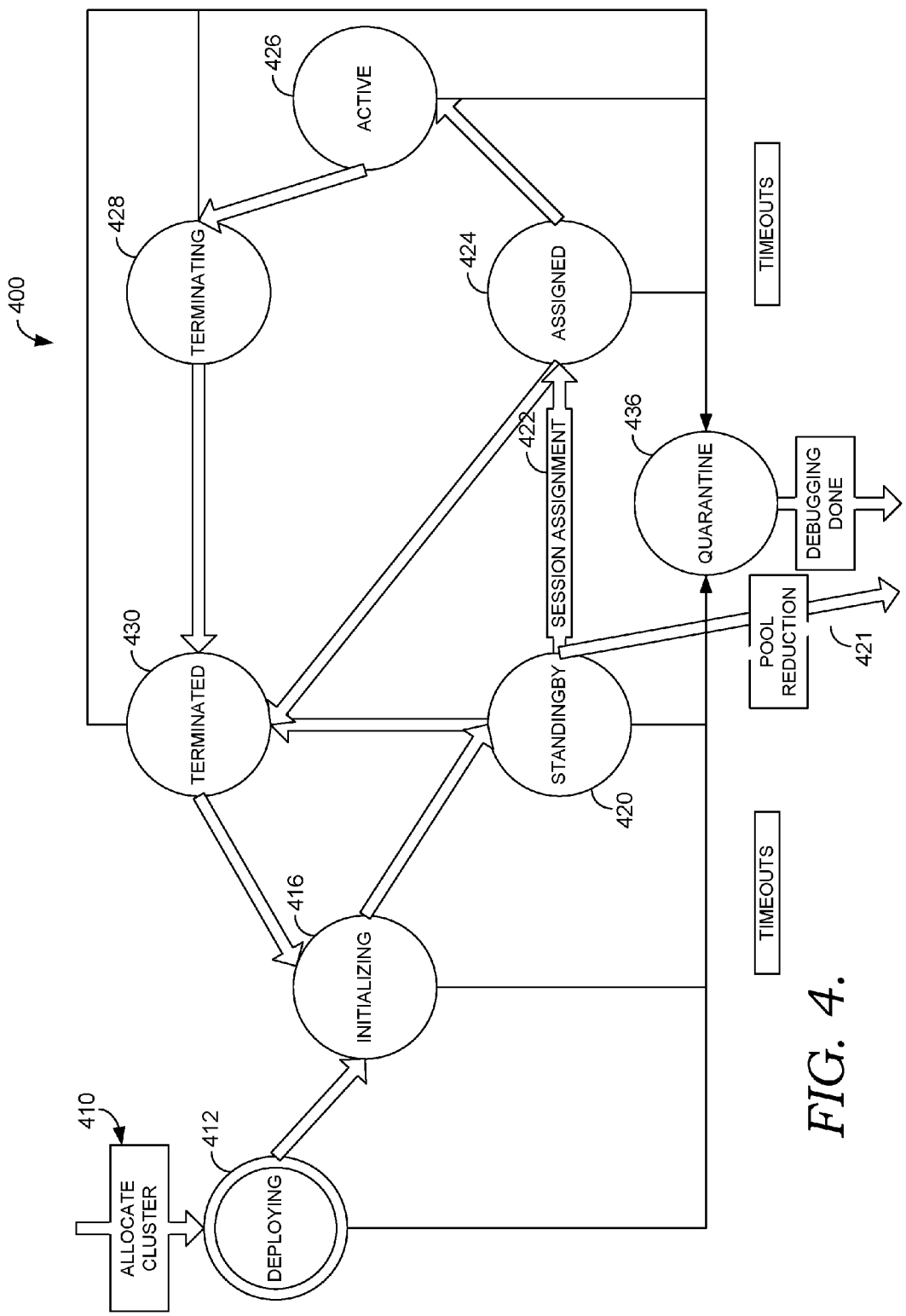
FIG. 4 is a state diagram showing game instances in different stages within a remote gaming environment, in accordance with an embodiment of the present invention.

Turning now to FIG. 4, a state diagram showing game instances in different states of deployment is provided, in accordance with an embodiment of the present invention. The states shown in FIG. 4 are exemplary. Embodiments are not limited to these states. Other intermediate states could be possible depending on a level of granularity desired in the state diagram. Alternative, the states shown could be compressed. Initially, at the deploying state 412, computer resources are allocated 410 within the data center to create a game instance. The computer resources include processing, memory, and other hardware used by a game execution environment.

A unit of computing resources may be demarked by a physical machine or a virtual machine. In one embodiment, an additional server, which is a physical machine, is allocated to a game session as a computing unit. In this case, the physical server has a one-to-one relationship with the computing unit or resource. In another embodiment, virtual machines are used. A virtual machine artificially segregates a single physical computing device into two or more virtual machines. Each virtual machine is able to carry out the capabilities of a full server but shares the capacity of the CPU and other components of the hardware device with one or more additional virtual machines. In one embodiment, a single real or virtual machine hosts multiple game sessions.

The capacity of a real or virtual machine may differ. Thus, physical or virtual machines of different sizes may be assigned to a game service. The game service may select a computing resource having a first capacity or a second capacity for various game titles as needed. A game session for a first game title may run on a server having a first capacity and a game session for a second game title may run on a server having a second capacity. In one embodiment, a game session uses several virtual machines. In another embodiment, a single virtual machine runs multiple game sessions.

At the initializing state 416, content is installed on the computer resources and the computer resources are configured for gameplay. The configuration process may include adjusting settings on the allocated computer resources for optimized play of a particular game title. Optimum settings for a game title may be retrieved from a table.

From the initializing state 416, the game instance is placed in the standby state 420. In the standby state 420, the game instance is not connected to a particular game session or players. When there is a need for a new active session, a game instance in the standby state 420 is placed into an assigned state 424. In the assigned state 424, additional configuration occurs, the game instance is assigned 422 with a game session, and players are connected to the game instance. In the assigned state 424, player preferences and characteristics may be added to the game to start the game at a place where the player last left it. Player achievements and powers may be reflected when the player joins the game instance. The game remains in the active state 426 during the duration of gameplay.

Once gameplay ends, the game instance transitions to a terminating state 428. In a terminating state 428, a progress record may be stored along with other game features that are used to allow the player to rejoin the game at a later time while maintaining game progress. From the terminating state 428, the game instance moves to the terminated state 430. At the terminated state, various testing may be done to ascertain whether the game code is sound and can be reused. If a fault in the game code or other configuration is detected, the game instance may transition to the quarantine state 436. A game instance may transition to the quarantine state 436 at any point when a fault or other problem is detected with the game instance.

In one embodiment, all healthy game instances that reach the terminated state are restarted and move to the initializing state and then the standby state. In one embodiment, only the current number of game instances in the standby pool is monitored and used to forecast optimal demand and determine whether additional instances should be created. Alternatively, when a game instance reaches the terminated state 430, a determination may be made whether to reuse the terminated game instance. If the demand indicates that a terminated game instance should be reused, then the game instance may transition to the initializing state 416 before returning to a pool of game instances in the standby state 420. The demand calculation will be described in more detail subsequently. When there is determined to be in excess of standby game instances, a pool reduction process 421 may be implemented to destroy the game instance. The computer resources allocated to destroy the game instance may then be reallocated across the data center as needed.

Figure 5:
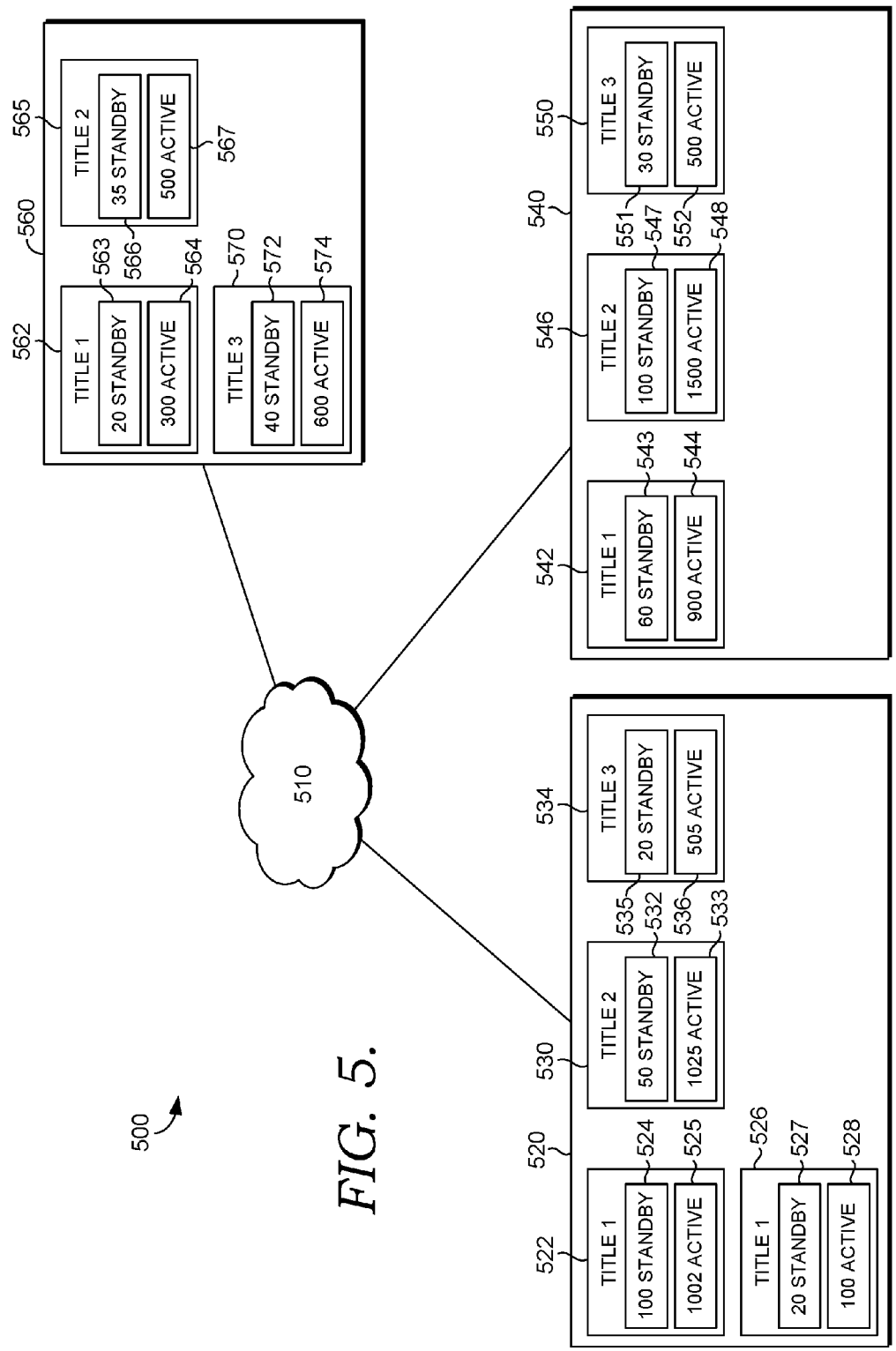
FIG. 5 is a diagram that illustrates allocation of standby and active game instances within a remote computing environment, in accordance with an embodiment of the present invention.

Turning now to FIG. 5, pools of standby game instances are illustrated, in accordance with an embodiment of the present invention. The remote game environment 500 Includes data center 520, data center 540, and data center 560 connected by network 510. Each data center hosts a game service that provides various game titles. The game service may be similar to the game server 340 described previously with reference to FIG. 3.

Data center 520 includes four game pools. Game pool 522 and game pool 526 host instances of a game title one. Game pool 530 hosts instances of title two and game pool 534 hosts instances of a game title three. Game pool 522 includes 1002 active instances 525 of the game title one and 100 standby instances 524. Game pool 526 includes 20 standby instances 527 and 100 active instances 528. The game pool 530 includes 1025 active game instances 533 and 50 standby game instances 532. The game pool 534 includes 505 active instances 536 and 20 standby instances 535.

Game pools 522 and 526 are both dedicated to hosting the same game title. Game pool 526 is an example of a sandbox. A sandbox is a virtual partition of the computing resources dedicated to a particular task. For example, game developers or premium members may be the only individuals able to access games within game pool 526. The anticipated demand for each game pool may be calculated separately based on the characteristics of the particular game pool being evaluated.

The data center 540 hosts three game pools with the same three titles hosted by data center 520. Notice that the amount of standby active games for each title differs from those in game pools within data center 520 or data center 560. The demand for a game may differ from data center to data center. In one embodiment, a demand calculation is made for each pool of games. The demand calculation takes into account performance within the data center hosting the game pool. For example, computing resources may be brought on more quickly in some data centers than in others. All else being equal, data centers that bring games online more quickly need less standby instances to meet demand. Additionally, historical usage at different data centers may be used to calculate demand for the particular game pools within the data center.

Game pool 542 includes 60 standby instances 543 and 900 active instances 544. Game pool 546 includes 100 standby instances 547 and 1500 active standby instances 548. Game pool 550 includes 30 standby instances 551 and 500 active instances 552.

Data center 560 hosts three game pools. Game pool 562 includes 20 standby instances 563 and 300 active instances 564. Game pool 565 includes 35 standby instances 566 and 500 active instances 567. Game pool 570 includes 40 standby instances 572 and 800 active instances 574.

In addition to managing the game instances, computing resources associated with the game instances may be managed by adding and subtracting computing resources to a game service as needed. Within the game service, the computing resources may be assigned to a monitoring group or pool of game instances. Network resources may also be managed by the game service to facilitate communications between the client devices and the game session. Thus, as additional computing devices are allocated to a game service, the network resources may be updated to route communications appropriately to the computing devices on which the game service is running.

When allocating new resources to a game service, the resources may be selected for their proximity to the computing resources already serving the game service. For example, in a game service running over multiple data centers, a computing resource located within the same center may be favored over a computing resource in a different server farm. Similarly, a server with close proximity within a rack or virtual relationship with the machines already part of the game session may be preferred over those having a less proximate relationship. Computing resources may be recycled from an active game session that ends to an active game session running the same title, perhaps at the same game stage.

Forecasting Demand for Game Instances

As can be seen in FIG. 5, different game pools have different amounts of standby games. As mentioned, demand for a particular game may be forecast and used to determine how many standby game instances are provided. Each game, and each game pool, may be associated with different characteristics that result in a different optimal amount of standby games. This description of demand forecasting describes calculated demand for a single game pool, for the sake of simplicity. In an actual embodiment, a similar calculation will be performed for each game pool. Similarly, a calculation could be performed for each data center or other grouping of games and used to forecast demand for resources related to game instances. For example, the computer resources needed to host game instances may be added at the same rate that demand for game instances increases.

The demand calculation may be triggered upon detecting various events. For example, the demand calculation may be performed every time a resource enters the deploying state, as shown in FIG. 4. A resource entering the standby state may similarly trigger recalculation of demand. Depending on the results of the recalculation, the standby game instance could be terminated or allowed to remain in the standby pool. Reaching the initializing state, active state, or quarantine state could also trigger recalculation of demand. In one embodiment, a request to recalculate demand is periodically generated. In one embodiment, a request is generated every threshold amount of minutes if a recalculation had not been otherwise triggered in the last threshold amount of minutes.

The demand calculation is an input into a resource allocation function. The resource allocation function essentially asks how many standby resources should be created or destroyed at the present time. The resource allocation function does not create or destroy game instances in the active state. Active game instances are created upon a specific request from a player and terminated when gameplay ends, or perhaps when a fault is detected. As shown in FIG. 4, active game instances are created from standby game instances.

The answer to the resource allocation function may be described as a resource delta. The resource function may be expressed as the resources needed minus the resources existing. The resources existing may be defined as the current count of game instances in the standby state, plus games in the initializing state, plus game instances in the deploying state, plus games in the terminated state that are designated for the standby state. In one embodiment, all terminated instances are designated for the initializing state, unless a fault is detected. Thus, games in the terminated state that are destined to be destroyed or quarantined are not included in the existing resources variable. The resources needed may be calculated using a forecasting model.

The forecasting model attempts to estimate how many resources will be needed at a point in the future. In one embodiment, the point in the future is designated as the point when a deployment process starting in the present would reach the standby state. For example, if it takes six minutes for an instance of a game title to transition between the deploying state and the standby state, then the forecast model could attempt to forecast resources needed six minutes in the future. Alternatively, demand could be forecast at a fixed time in the future, such as an hour.

In one embodiment, a resource supplement is used in combination with forecast demand. The supplemental amount of resources is added to the optimal amount of forecast amount for generate the final forecast amount. The resource supplement may be established on a temporary or permanent basis. For example, a temporary supplement may be established in conjunction with a known event that may cause unusual demand. For example, a launch date, a contest, or other promotion may cause demand to spike. This demand may be anticipated by adding an amount of supplemental resources needed for a particular time. The resource supplement may be a fixed amount established editorially. When forecast demand is zero, then the resource supplement acts as a floor.

The function used to forecast demand may be expressed as the resources currently needed is equal to a rate of requests for new active game instances multiplied by an average creation time. Expressed as an equation:

$$\text{\# resources currently needed} = \text{rate of allocation requests} * \text{avg creation time}$$

In one embodiment, the average creation time is the time it takes for a game instance to transition from the deploying state to the standby state. The average creation time may be calculated using an analysis of historical data. The range of historical data may vary. In one embodiment, the average creation time is calculated using a recent time period, such as the last half hour. In another embodiment, the average creation time is calculated over a longer period, such as the last week.

To illustrate the resource forecast with numbers, assume 10 allocation requests for new game instances per second with a 60-second average creation time. Then the # of resources currently needed=10 allocation requests per sec*60 sec avg creation time=600 game instances in standby. Thus, if the rate of allocation requests and average creation time remained constant, approximately 600 game instances would be needed in the standby state to satisfy the demand.

However, demand is not always constant throughout the day or from day to day. In one embodiment, the allocation requests per second and average creation time are frequently recalculated based on recent data. For example, a demand trend could be accounted for by using the actual requests per second over the last 30 seconds or some other threshold time period; similarly, the average creation time could be recalculated to account for present conditions.

In one embodiment, fluctuating demand is accounted for using a configurable probability such that future demand at any point in time will be less than or equal to the demand forecast. Within the probability calculation, each call to transition a standby game instance to an active game instance is referred to as a shock. The instantaneous rate of shocks is known as the arrival rate λ. In one embodiment, the probability calculation assumes that λ̂ follows a Markov process and, therefore, is of the Poisson distribution.

Continuing with an explanation of the configurable probability, the average deployment time for a game instance is $W_{deploying}$. The average active time for a game instance (as measured from when an instance leaves standby until it reenters standby after hosting a session) is $W_{active}$. A time series, as defined in the mathematical field of time series forecasting, is dissected into a systemic part and nonsystemic part. The systemic part may be divided into three components: level, trend, and seasonality. The nonsystematic part is called noise. The systemic components are assumed to be unobservable, as they characterize the underlying series, which is observed with added noise. Level describes the average value of the series, trend is the change in the series from one period to the next, and seasonality describes the short-term cyclical behavior that can be observed several times within the given series.

In one embodiment, seasonality is omitted from the probability calculation. Seasonality may be ignored when the probability is calculated over a relatively short time, such as a few minutes or hours. As mentioned previously, event-based variations such as tournaments or launch scenarios may be accounted for separately by establishing a temporary resource supplement. Alternatively, the event-based variations may be accounted for by setting a minimum resource availability for the game title during the event.

During a relatively short time period, on the order of dozens of minutes or a couple of hours, the time series level and trend may be predicted using polynomial extrapolation. The shocks are registered and aggregated into a series of observations Z. The observation $Z_t$ is the integral of λ over the time interval (t−1) to t divided by t−(t−1); in other words, the average number of shocks per time unit between time t−1 and t. The observed time series may be calculated $Z_{t-n}, \ldots, Z_{t-2}, Z_{t-1}, Z_t$ for each game instance.

A time series forecasting algorithm may be applied to this time series, which helps predict the future resource need $E_{t+Wdeploy}$. In other words, the estimate of the incoming rate is used to generate an estimate of when the deployments started now will, on average, be completed.

Since the aggregation of individual shocks into observations are smoothing, the estimate in itself does not account for the noise within the observation. Since λ is a Markov process, the corrected estimate may be calculated as $CE_{t+Wdeploy}=PPF_{Poisson}(E_{t+Wdeploy}; P_{title})$ where $PPF_{Poisson}$ is the percentage point function for the Poisson distribution. At the end of every observation, the CE value may be calculated for each game pool, the resource delta calculated, and the resource allocation or adjustment made.

The observed time series mentioned above may be extrapolated to smooth the demand calculation. In one embodiment, the linear extrapolation of the observations is computed, taking into consideration deployment time: $EZ_{t+Wdeploy}=CEIL(MAX(Z_t*W_{deploy}, AVG(Z_{t-n}, \ldots, Z_{t-2}, Z_{t-1}, Z_t))$. The max of the latest observation and the average of the entire series are used in the extrapolation. This helps further smooth out the curve when there is little traffic in the system. This lets the algorithm deal with sudden short spikes, while using the average over the entire series makes the algorithm not "forget" about traffic when there are short periods of inactivity. Next $CE_{t+Wdeploy}$, also known as the 'need', is calculated: $CE_{t+Wdeploy}=PPF_{Poisson}(EZ_{t+Wdeploy}+S_t; P_{title})$. $S_t$ is the number of active sessions at time t.

A polynomial extrapolation may be completed by viewing the set of observations in the observed time series as points on a graph where the time series observations are on the y-axis and time is on the x-axis. A polynomial equation can be constructed such that it fits the points on the graph. The least square method can be used to fit a polynomial equation of the kth degree to the observed points. This can be achieved by solving a matrix equation.

Let A be the 1*k matrix of polynomial coefficients $[a_0\ a_1\ \ldots\ a_k]$ of the equation $a_0x^0+a_1x^1+\ldots+a_kx^k$.

Let Y be the 1*n matrix of observed values $[y_1\ y_2\ \ldots\ a_n]$.

Let X be the Vandermonde matrix:

$$\begin{pmatrix} 1 & x_1 & x_1^2 & \ldots & x_1^k \\ 1 & x_2 & x_2^2 & \ldots & x_2^k \\ \vdots & \vdots & \vdots & \ldots & \vdots \\ \vdots & \vdots & \vdots & \ldots & \vdots \\ \vdots & \vdots & \vdots & \ldots & \vdots \\ 1 & x_n & x_n^2 & \ldots & x_n^k \end{pmatrix}$$

The matrix equation Y=X*A may be solved each time the future demand for game instances is determined.

Let $X^T$ denote the transpose of the matrix X.

$X^T*Y=X^T*X*A$ (multiply both sides by $X^T$).

$(X^T*X)^{-1}*X^T*Y=(X^T*X)^{-1}*X^T*X*A$ (multiply both sides by $(X^T*X)^{-1}$.

$(X^T*X)^{-1}*X^T*Y=A$ (simplify the right side).

Thus, given a set of observations and a decision on how many degrees k of the polynomial, the coefficients can be solved for the least square fitting against the data set. Runge's phenomenon states that the higher the k, the better approximation of the observations, but the more the equation can oscillate rapidly. Since embodiments may use the equation to compute the prediction in the future, it is at risk of oscillations. Further, a k degree polynomial can approximate a curve with k−2 inflection points. Historical data shows that for the short time frame (dozens of minutes), the model of only one inflection point may be used. To minimize the risk of oscillation, in one embodiment, k is set to 3.

Once the coefficients for the observations are determined, an estimate of λ may be computed at any point in time. The estimate may be used to make a prediction W minutes into the future, where W is continuously measured. The prediction is checked against a set of boundary conditions, to avoid "hockey sticks" at very low load, and to make sure there is enough buffer for drastic inflection points under high load.

In one embodiment, the prediction may be no higher than the highest actual observation in the past multiplied by ten and the prediction may be no lower than the highest actual observation seen in the past 24 hours. Once a prediction has been made, the Poisson percentage point function is applied to the prediction, as described above. The estimated number of resources needed W minutes into the future is then calculated as the number of currently waiting sessions+ number of active sessions+prediction*W/observation window size. The waiting sessions may include deploying sessions, initializing sessions, and standby sessions.

Figure 6:
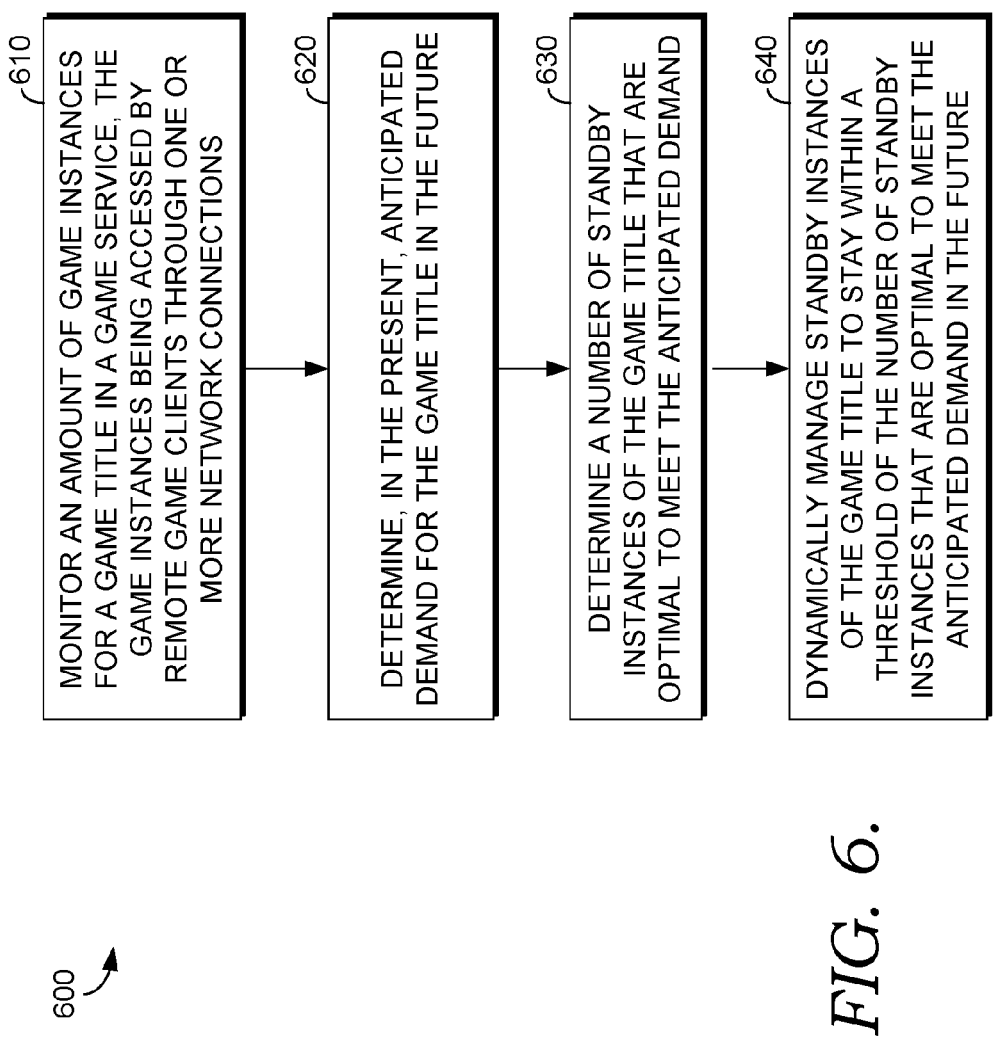
FIG. 6 is a flow chart showing a method of managing game instances within a remote game service, in accordance with an embodiment of the present invention.

Turning now to FIG. 6, a method 600 of managing game instances within a remote game service is provided, in accordance with an embodiment of the present invention. The game server may be similar to the game services described previously. The game service provides a remote gaming experience to one or more client devices. All or part of the game experience may be provided by code running on the game service. The code runs within a game session that may include one or more players. A single game session running a game title may be described as a single game instance. The game service may be providing thousands of game instances at any one time. The game service may utilize several different data centers. Method 600 manages game instances to ensure that game instances are available when players want to utilize them. To make game instances available, the computing resources on which the game instances run also are managed.

At step 610, an amount of game instances for a game title in the game service is monitored. Game instances for a title may be monitored within different monitoring groups. In one embodiment, all game instances for a particular title are monitored together within a single data center. Each data center may have its own monitoring group for a particular game title. In some embodiments, there may be multiple monitoring groups on a single data center for a single game title. As described previously in FIG. 4, game instances for a game title may be in different states. The amount of game instances in each state may be monitored and tracked.

At step 620, anticipated demand for the game title is presently determined. The anticipated demand is for a point of time in the future. For example, the anticipated demand may be for 12 minutes in the future. In one embodiment, future demand is calculated for a point in time when deployment of a game instance would reach the standby state if deployment started immediately. The future demand may be thought of as an amount of active game sessions needed in the future.

In an embodiment of the present invention, active games are initiated using game instances in the standby state. At step 630, a number of standby instances of the game title that are optimal to meet the anticipated demand is determined. This may be referred to as the optimal amount of standby instances. In one embodiment, the optimal amount is calculated by multiplying the rate of requests for active game instances by the time it takes for active game instances to be created from scratch. In another embodiment, the time it takes for a standby game instance to be created from scratch is used. As described in detail above, a polynomial extrapolation may be used to anticipate changes in the request rate.

At step 640, standby instances of the game title are dynamically managed to stay within a threshold of the number of standby instances that is optimal to meet the anticipated demand for the future. In one embodiment, every time a game instance reaches the terminating state, a calculation is performed to determine whether more or fewer standby instances are needed. If more are needed, then the terminated game state is restarted and designated for the standby state pool. If fewer instances are needed, then the game instance is destroyed and the associated computing resources are reallocated to a different game pool. In another embodiment, only the standby pool is evaluated and game instances are added to or removed from the standby pool as needed.

Figure 7:
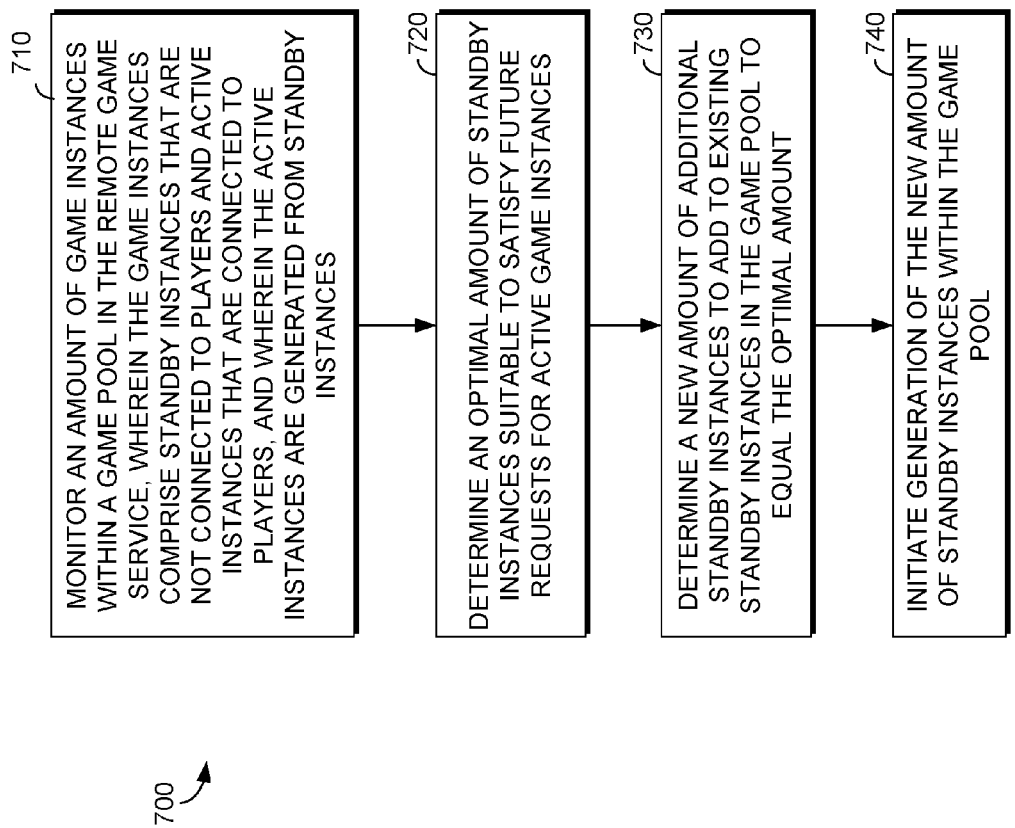
FIG. 7 is a flow chart showing a method of managing game instances within a remote game service, in accordance with an embodiment of the present invention.

Turning now to FIG. 7, a method 700 of managing game instances within a remote game service is provided, in accordance with an embodiment of the present invention. At step 710, an amount of game instances within a game pool in the remote game service is monitored. As described previously with reference to FIG. 4, game instances for a game title can be in different states at different times. The monitoring may include how many game instances are at different states. The game instances monitored comprise at least standby instances that are not connected to players and active instances that are connected to players. As mentioned, the active instances are generated from standby instances. This allows active instances to be generated quickly and to avoid delays.

At step 720, an optimal amount of standby instances suitable to satisfy future requests for active game instances is determined. Methods of determining the optimal amount of standby instances have been described. Additionally, an resource supplement may be added to a forecast supplement to calculate the optimal amount. The resource supplement may be specifically adjusted in anticipation of a demand-altering event. For example, a launch of a new game, a game tournament, or a launch of a game improvement may cause demand to temporarily increase in a way that is not easily anticipated by calculations based on normal historical usage. In one embodiment, an interface is provided for developers or others to specify an amount of supplemental resource and a duration for when the supplemental resources should be added.

At step 730, a new amount of additional standby instances to add to existing standby instances in the game pool to equal the optimal amount is determined. The new amount may be calculated by subtracting the existing amount from the optimal amount.

At step 740, generation of the new amount of standby instances is initiated within the game pool. Initiating new game instances may require requesting additional computing resources to be allocated to the game pool. Alternatively, additional resources may have already been allocated to the game pool and they are now put to use to generate additional standby game instances.

Figure 8:
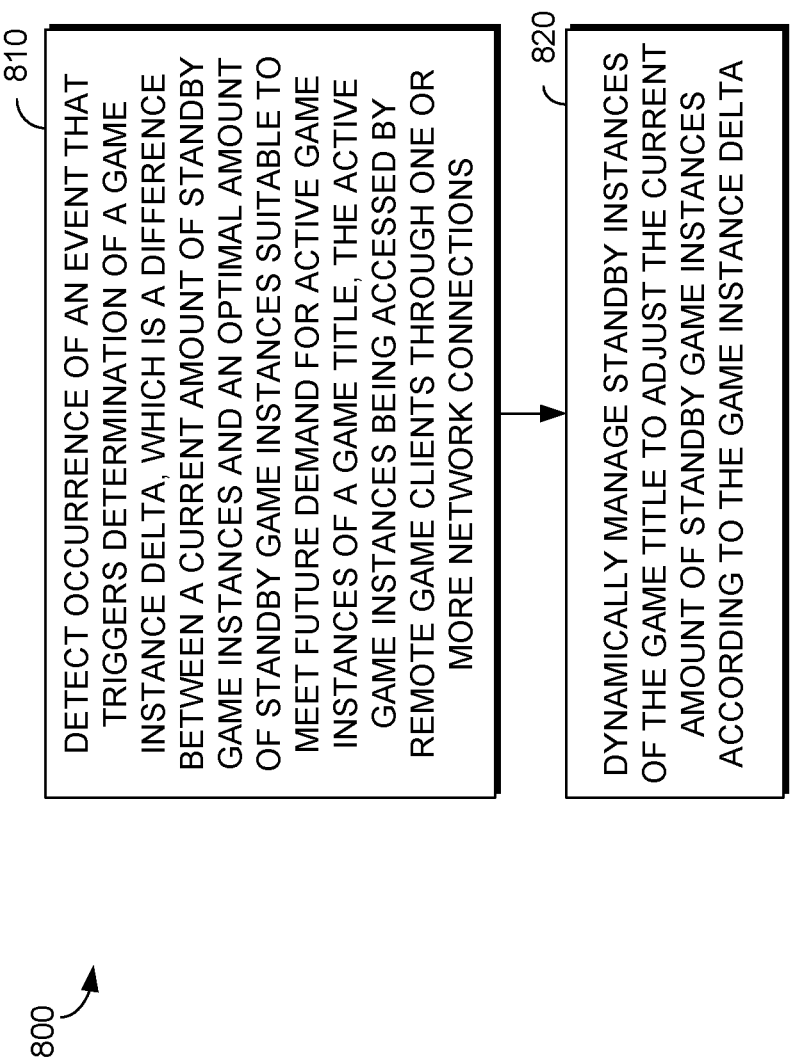
FIG. 8 is a flow chart showing a method of managing game instances within a remote game service, in accordance with an embodiment of the present invention.

Turning now to FIG. 8, a method 800 of managing game instances within a remote game service is provided, in accordance with an embodiment of the present invention. At step 810, occurrence of an event that triggers determination of a game instance Delta is detected. A game instance Delta is the difference between the optimal amount of standby game instances needed to meet the anticipated demand and the present level of standby game instances. At step 820, standby instances of the game title are dynamically managed to adjust the current amount of standby game instances according to the game instance Delta. Game instances may be adjusted by adding or subtracting standby game instances. In one embodiment, the level of standby game instances is depleted by attrition. That is, standby game instances become active game instances as requested, but new standby game instances are not generated to replace those that became active game instances until the game instance Delta reaches zero.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. A computing system comprising:
   a processor; and
   computer storage memory having computer-executable instructions stored thereon which, when executed by the processor, implement a method of managing game instances within a remote game service, the method comprising:
   monitoring an amount of game instances for a game title in a game service, the game instances being accessed by remote game clients through one or more network connections;
   determining, in the present, anticipated demand for the game title in the future;
   determining a number of standby instances of the game title that are optimal to meet the anticipated demand; and
   dynamically managing standby instances of the game title to stay within a threshold of the number of standby instance that is optimal to meet the anticipated demand in the future by determining a number of standby game instances to be created or destroyed at a present time by subtracting a number of existing game instances from the number of standby instances of the game title that are optimal to meet the anticipated demand;
   detecting an event that triggers recalculating the number of standby game instances to be created or destroyed at the present time, wherein the event comprises at least one of a game instance entering an active state.

2. The system of claim 1, said determining the number of standby instances of the game title that are optimal to meet the anticipated demand comprises multiplying a rate of requests for the active game instances by a duration of time taken to form a new standby game instance.

3. The system of claim 1 wherein the standby game instances are not connected to players.

4. The system of claim 1, wherein existing game instances comprise instances of the game title presently in a standby state, a deploying state, and an initializing state.

5. The system of claim 1, wherein said determining anticipated demand for the game title in the future comprises multiplying a rate of requests for active game instances of the game title by a duration of time that a game instance takes to reach a standby state.

6. The system of claim 5, wherein the duration of time is an average duration.

7. The system of claim 6, wherein the rate of requests is calculated using polynomial extrapolation of a series of actual rate measurements.

8. A method of managing game instances within a remote game service, the method comprising:
   monitoring an amount of game instances for a game title in a game service, the game instances being accessed by remote game clients through one or more network connections;
   determining, in the present, anticipated demand for the game title in the future;
   determining a number of standby instances of the game title that are optimal to meet the anticipated demand; and
   dynamically managing standby instances of the game title to stay within a threshold of the number of standby instance that is optimal to meet the anticipated demand in the future by determining a number of standby game instances to be created or destroyed at a present time by subtracting a number of existing game instances from the number of standby instances of the game title that are optimal to meet the anticipated demand;
   detecting an event that triggers recalculating the number of standby game instances to be created or destroyed at the present time, wherein the event comprises at least one of a game instance entering an active state.

9. The method of claim 8, said determining the number of standby instances of the game title that are optimal to meet the anticipated demand comprises multiplying a rate of requests for the active game instances by a duration of time taken to form a new standby game instance.

10. The method of claim 8, wherein the standby game instances are not connected to players.

11. The method of claim 8, wherein existing game instances comprise instances of the game title presently in a standby state, a deploying state, and an initializing state.

12. The method of claim 8, wherein said determining anticipated demand for the game title in the future comprises multiplying a rate of requests for active game instances of the game title by a duration of time that a game instance takes to reach a standby state.

13. The method of claim 12, wherein the rate of requests is calculated using polynomial extrapolation of a series of actual rate measurements.

14. The method of claim 12, wherein the duration of time is an average duration.

15. The method of claim 8, wherein the game title is accessed by multiple players simultaneously.

16. A method of managing game instances within a remote game service, the method comprising:
   detecting occurrence of an event that triggers determination of a game instance delta, which is a difference between a current amount of standby game instances and an optimal amount of standby game instances suitable to meet future demand for active game instances of a game title, the active game instances being accessed by remote game clients through one or more network connections, wherein the event is a game instance entering an active state; and
   dynamically managing standby game instances of the game title to adjust the current amount of standby game instances according to the game instance delta.

17. The method of claim 16, wherein the standby game instances are not connected to players.

18. The method of claim 16, wherein the optimal amount is calculated by multiplying a rate of requests for the active game instances by a duration of time taken to form a new standby game instance.

19. The method of claim 18 wherein the rate of requests is over less than the last 10 minutes.

20. The method of claim 18, wherein the rate of requests is calculated using polynomial extrapolation of a series of actual rate measurements.

* * * * *